(12) United States Patent
Asplund et al.

(10) Patent No.: US 7,596,711 B2
(45) Date of Patent: Sep. 29, 2009

(54) METHOD AND NETWORK FOR SYNCHRONISTIC PROCESSING AND PROVIDING DATA USING AN EXTRAPOLATION DATA SET INCLUDING AT LEAST ONE UPDATE TIME POINT

(75) Inventors: Magnus Asplund, Paderborn (DE);
Andreas Hostmann, Paderborn (DE);
Robert Leinfellner, Paderborn (DE);
Robert Polnau, Paderborn (DE)

(73) Assignee: dSpace Digital Signal Processing and Control Engineering GmbH, Paderborn (DE)

( * ) Notice: Subject to any disclaimer, the term of this patent is extended or adjusted under 35 U.S.C. 154(b) by 364 days.

(21) Appl. No.: 11/428,125

(22) Filed: Jun. 30, 2006

(65) Prior Publication Data
US 2007/0088775 A1  Apr. 19, 2007

Related U.S. Application Data

(60) Provisional application No. 60/709,484, filed on Aug. 19, 2005.

(51) Int. Cl.
G06F 1/00 (2006.01)
G06F 15/16 (2006.01)
(52) U.S. Cl. ........................ 713/500; 709/205; 709/230
(58) Field of Classification Search .................. 713/500
See application file for complete search history.

(56) References Cited

U.S. PATENT DOCUMENTS

| | | |
|---|---|---|
| 5,748,923 A | 5/1998 | Eitrich et al. |
| 6,438,581 B1 | 8/2002 | Neuhauser et al. |
| 6,454,729 B1 * | 9/2002 | Jacobs et al. ................. 600/587 |
| 6,993,446 B2 * | 1/2006 | Gunawardana et al. ..... 702/117 |
| 2002/0111696 A1 | 8/2002 | Albrecht et al. |
| 2003/0154309 A1 | 8/2003 | Kero et al. |
| 2008/0263218 A1 * | 10/2008 | Beerends et al. ............ 709/230 |

FOREIGN PATENT DOCUMENTS

| | | |
|---|---|---|
| AT | 005327 | 5/2002 |
| DE | 4408488 | 9/1995 |
| DE | 19822211 | 11/1999 |
| DE | 10059270 | 6/2002 |

OTHER PUBLICATIONS

T. Gramann et al.: "Precision Time Protocol IEEE 1588 in der Praxis", Elektronik 24/2003, www.elektroniknet.de (8 pages), statement on the article (1 page) and translation thereof (1 page).

H. Kopetz et al.: "The Time-Triggered Architecture", IEEE, to appear in "Proceedings of the IEEE Special Issue on Modeling and Design of Embedded Software", Oct. 2002, pp. 1-14.

dSPACE firm brochure: "New: DS2211 HIL I/O Board, Compact Sollution for ECU Tests", dSPACE Digital Signal Processing and Control Engineering GmbH, Germany, 2004, pp. 210-215.

N. Nissanke: "Systems of Clocks, Clock Synchronisation", Prentice Hall Europe, ISBN 0-13-651274-7 (pbk), 1977, cover sheet (1 page) and pp. 349-383.

* cited by examiner

*Primary Examiner*—Suresh K Suryawanshi
(74) *Attorney, Agent, or Firm*—Darby & Darby

(57) ABSTRACT

A method for synchronously providing data on distributed devices of a network includes storing, by a master device, an extrapolation data set including at least one update time point. The update time point is in the future and marks the beginning of an extrapolation interval. The master device transmits the extrapolation data set to a slave device. Starting at an update time point, new data is calculated separately on the master device and the slave device by extrapolation using the extrapolation data set available on both the master device and the slave device. The method steps are repeated for subsequent extrapolation intervals.

47 Claims, 6 Drawing Sheets

METHOD AND NETWORK FOR SYNCHRONISTIC PROCESSING AND PROVIDING DATA USING AN EXTRAPOLATION DATA SET INCLUDING AT LEAST ONE UPDATE TIME POINT

Priority is claimed to provisional patent application No. 60/709,484, filed Aug. 19, 2005, the entire subject matter of which is hereby incorporated by referenced herein.

The present invention relates to a method for synchronously providing data ($x_{net}$) on distributed devices of a network, especially on devices of a distributed real-time system, said network including at least one master device, at least one slave device associated with the master device, and a data channel connecting the master device and the slave device, and said master device and said slave device having a common synchronous system time. The present invention also relates to a network for synchronously providing data, including a master device, at least one slave device, and at least one data channel connecting the master device and the slave device, said master device and said slave device each having a synchronized system clock to provide a common synchronous system time.

BACKGROUND

Methods and networks of the type in question have been known for quite some time, especially from technical fields of application that not only generally require data to be distributed and provided on different devices of a network, but for which the simultaneous availability of the data on the distributed devices is also of particular importance.

It is natural for such time-critical requirements to occur especially in the field of distributed real-time applications, where what matters is not primarily to process data as fast as possible in the broadest sense, but to perform specific predefined data processing tasks in an accurately timed and synchronous manner on the devices of the network. Typical application fields where it is imperative to be able to provide and process data synchronously on distributed network devices include the programming, testing and subsequent control of control units in the context of rapid control prototyping, hardware-in-the-loop simulation, and control unit calibration.

The technical implementation of the aforementioned processes is often accomplished using a network of devices which are interconnected via a data channel and which are, for example, I/O devices and computing devices; said I/O devices communicating with the process to be controlled and/or monitored, and said computing devices coordinating the timing of the tasks to be performed by the I/O devices. In more complex technical processes, a plurality of different I/O devices communicate with one and the same process to simultaneously measure and actively control process states. The state variables of a technical process are usually, at least partially, linked to one another and, therefore, are also time-dependent on each other.

An example which serves very well to illustrate such a dependency is a multi-cylinder internal combustion engine, in which the pistons are linked via the crankshaft and the valves are linked via the camshaft, and both of these areas are in turn indirectly physically linked via the ignition and injection system. Now if, for example, the firing signals for different pistons are generated by different I/O devices of the network, and the generation of the firing signals is performed as a function of the crankshaft angle of rotation, it is immediately clear that the information about the crankshaft angle of rotation must be identical (and therefore in sync) on all distributed I/O devices in order that the timed control of the various engine components can be fine-tuned to the degree required by the physical linkage of the engine.

The same problem, which in the illustrated example stems from the field of rapid control prototyping, occurs analogously in so-called hardware-in-the-loop simulations, which do not simulate the control or control unit but, at least partially, the real environment of the control unit, which itself is tested in the simulated environment. Thus, in the case of an engine control unit, the control unit is supplied with data of a simulated internal combustion engine (for example, angular speeds of the camshaft and crankshaft, cylinder and valve positions, knock sensor signal, etc.); these signals being generated and provided by different I/O devices so that this data must also be generated and provided synchronously.

In practical applications, the problem of synchronously providing data on different devices of a network is known to be solved by defining and configuring one device as a master device which has the feature of allowing the data to be provided to be generated as a function of a system time available on the master device. The data generated on the master device is then distributed over a parallel data channel to the other devices, called slave devices, and the data received by the slave devices is then immediately activated, i.e., made available for further use, on the slave devices (dSPACE GmbH: "Solutions for Control", 2004, pages 210-215).

In this connection, depending on the technical field of application, the data channel connecting the master device and the slave device must meet high demands in terms of the achievable transmission rate and with respect to an undelayed transmission. For example, for reliable testing of engine control units, as described earlier with respect to the hardware-in-the-loop simulation, the corresponding angle signals must be changed and provided on all devices of the network in the microsecond ($10^{-6}$ s) or even sub-microsecond range. The example illustrates the immense quantities of data that must be able to be transmitted by a data channel that establishes the connection between a master device and a slave device using the method known from the prior art. At the same time, this also involves significant limitations with regard to other uses of the data channel, sensitivity to irradiation and emission of signals, and the usability of error detection and correction mechanisms.

From the prior art it is also known to synchronize a master device and a slave device in time by making the same system time available on both devices. The question of how to synchronize distributed clock systems is not the subject matter of the present invention. Rather, it is assumed that using one of the many known methods for clock synchronization will allow a uniform, synchronous system time to be established also on the network devices in question, here on the master device and the associated slave device. In this regard, reference is made to the relevant literature, such as Nissanke, N.: "Realtime Systems", chapter 16 "Systems of Clocks", Prentice Hall, Series in Computer Science, 1997.

SUMMARY OF THE INVENTION

An object of the present invention is to provide a method for synchronously providing data on distributed devices of a network so as to address, at least partially, the aforementioned problems in the synchronous provision of data on distributed devices of a network.

The present invention provides, first of all, a method for synchronously providing data on distributed devices of a network in that an extrapolation data set including at least one update time point which is in the future and which marks the beginning of an extrapolation interval is stored by the master device and transmitted to the slave device; that, starting at the update time point, new data is calculated separately on the master device and the slave device by extrapolation using the extrapolation data set available on both the master device and the slave device; and in that the above method steps are repeated for subsequent extrapolation intervals.

In contrast to the methods known from the prior art, the method of the present invention no longer transmits individual data items to be synchronously provided from the master device to the slave device. Instead, it transmits an extrapolation data set including an update time point and other data required to perform an extrapolation. Since both the master device and the slave device have a synchronous system time, both devices are able to start calculating the data to be synchronously provided when the update time point is reached; the calculation being carried out by extrapolation on the basis of the extrapolation data. In this connection, the extrapolation can also be carried out synchronously on the master device and the slave device as a function of the system time.

Thus, the extrapolation on the master device and the slave device allows a plurality of individual data items to be calculated on the distributed devices without each time having to exchange information between the master device and the slave device over the data channel, as is the case in the method known heretofore. This significantly reduces the volume of data to be transmitted over the data channel between the master device and the slave device, so that the data channel could now also be used to transmit other additional data between the devices of the network, leaving sufficient time to, for example, execute transmission error detection and correction protocols on the master device and the slave device.

The time span between two consecutive update time points marks an extrapolation interval. Thus, within one extrapolation interval, one and the same extrapolation data set forms the basis for calculating and synchronously providing the data on the devices of the network.

In a first advantageous embodiment of the present invention, the method is carried out such that the extrapolation on the master device and/or the slave device in each case starts from the last value of the data to be provided that was calculated by the respective device in the previous extrapolation interval. In this manner, it is accomplished that the curves of the data calculated on the master device and the slave device are, geometrically speaking, substantially "smooth" at the extrapolation interval boundaries, although it is not possible to speak of "continuity", at least not in the general case, because the calculation of the extrapolation in an extrapolation interval is carried out in a time-discrete manner, whether because a continuous-time function is calculated at discrete points in time, or whether the extrapolation rule is already formulated in a time-discrete manner. However, it is disadvantageous that, if errors occur, these errors may propagate through an arbitrary number of extrapolation intervals.

In another exemplary embodiment of the method of the present invention, the extrapolation data set includes a reference datum for the data to be calculated by the master device and/or the slave device at the update time point. In contrast to the previously described embodiment of the inventive method, the reference datum is used on the master device and/or the slave device at the update time point to calculate the extrapolation, so that the extrapolation starts from the reference value. Thus, it is achieved that, at the beginning of each interval, data calculations which may deviate on different devices of the network, for example, because of different data formats or faulty transmission of extrapolation data sets, are set to a uniform value, and that deviations are corrected in this manner. However, this has the disadvantage that considerable jumps may result for the calculated data at the extrapolation interval boundaries.

In order to prevent possible jumps from occurring at the extrapolation interval boundaries without sacrificing the advantage of the correction capability residing in the transmission of an absolute reference datum at the update time point, an embodiment of the inventive method provides for the master device and/or the slave device to initially check at the update time point whether the datum calculated on the respective device at the end of the previous extrapolation interval deviates from the predetermined reference datum.

If such a deviation is detected, the (error-free) datum which would have to exist at the end of the current extrapolation interval is calculated on the master device and/or the slave device based on the updated extrapolation data set. This value can be exactly calculated if the point in time at which the current extrapolation interval ends is known to the master device and the slave device, respectively. This is the case, for example, if the extrapolation intervals are embedded in a fixed time pattern having equidistant interval boundaries. Otherwise, the length of the current extrapolation interval has to be estimated, for example, using the average length of several previous extrapolation intervals.

When the expected value of the datum at the end of the current extrapolation interval, which is either error-free or affected by slight estimation inaccuracies, is finally known, the extrapolation data set is adjusted such that the datum calculated at the end of the current extrapolation interval (based on the last data value calculated in the previous extrapolation interval!) is substantially equal to the previously calculated, error-free value, i.e., the value which would have been expected in the deviation-free case without adjustment of the extrapolation data.

In an exemplary embodiment of the inventive method, the function type, for example a polynomial, which forms the basis for performing the extrapolation on the master device and the slave device, is predetermined, so that the extrapolation data set includes only parameters which, in combination with the predetermined function type, define a unique extrapolation function. This extrapolation function may be calculatable as a function of the system time, or be formulated iteratively or recursively, as is known especially from the representation of discrete-time equations in a fixed time pattern.

In another exemplary embodiment of the inventive method, the extrapolation data set also includes information in general form about the function type, providing the highest possible level of adjustability of the extrapolation on the master device and the slave device. In an exemplary embodiment, the function types used are polynomials, and especially also polynomials which, at the transitions to adjacent extrapolation intervals, are continuous with respect to the extrapolation function itself, or, in addition, also with respect to one or more of its time derivatives. Polynomials which are defined under these conditions are also known as "splines".

The present invention also provides a network for synchronously providing data in which the master device and the slave device each include an extrapolation data set memory for storing an extrapolation data set containing at least one update time point ($t_{up, i}$), an extrapolation execution unit for synchronously calculating and providing data $x_{net, i}(t)$ based on the extrapolation data set in the extrapolation data set memory, an updating unit for triggering the extrapolation execution unit to use the extrapolation data set from the extrapolation data set memory starting at update time point ($t_{up,\,i}$) (start of the current extrapolation interval); and in which the master device additionally includes an extrapolation planning unit for, at least partially, calculating the extrapolation data set and/or for providing the extrapolation data set in the extrapolation data set memory of the master device and of the slave device; it being possible for the extrapolation data set to be transmitted from the master device to the slave device over the data channel.

In comparison with the previously known networks including a master device and a slave device, the master device and the slave device of the present invention are provided with increased functionality, allowing data that is to be synchronously provided to be calculated independently on a segment-by-segment basis. The master device of the present invention differs from the slave device of the present invention in that it additionally has an extrapolation planning unit which may be used to calculate the extrapolation data set.

However, in an embodiment of the network of the present invention, the master device receives the extrapolation data set, at least partially, from a further external electronic device, either via the data channel or/and via a further external interface from a further data channel.

In an exemplary embodiment, the further external electronic device is a simulation computer which is connected to the master device via the further data channel and which partially frees the master device from having to calculate the extrapolation data set, so that the extrapolation planning unit constitutes only a slight functional enhancement over the slave device. Therefore, in an embodiment of the network of the present invention, the master device and the slave device can be of identical design in terms of hardware; such a universal master/slave device being configurable, by hardware or software, as an exclusive master device or an exclusive slave device. Common means for hardware-based configuration include, for example, the use of DIP or rotary switches, or using registers on the board of the universal master/slave device, said registers being loaded with corresponding configuration information.

In another exemplary embodiment of the inventive network, the extrapolation execution unit of the master device and of the slave device is configured in such a manner that the extrapolation performable by the master device and the slave device in each case starts from the last value of the data to be synchronously provided that was calculated in the previous extrapolation interval in the respective extrapolation execution unit. This design of the extrapolation execution unit ensures that jumps in the data in the transition region between two adjacent extrapolation intervals are at least not due to failure to account for previous calculation results. This may have the disadvantage that once an error occurs this error is propagated uncorrected through many extrapolation intervals.

In order to counteract this problem, a further embodiment of the inventive network provides that a reference datum of the data at the update time point is also stored in the extrapolation data set memory of the master device and/or of the slave device. In an embodiment of the inventive extrapolation execution unit of the master device and of the slave device, the extrapolation at the update time point starts from the stored reference datum. This design of the extrapolation execution units ensures that, at the beginning of each extrapolation interval, all slave devices supplied with the extrapolation data set by the master device use the same reference datum as a starting point, thereby correcting any deviation between the master device and the slave devices and/or between the slave devices.

However, in the above-described embodiment of the network of the present invention, the data calculated by the extrapolation execution unit may jump significantly at the transition between adjacent extrapolation intervals.

In an exemplary embodiment of the inventive network, the deviation between the datum calculated by the extrapolation execution unit of the master device at the end of the previous extrapolation interval and the reference datum stored in the extrapolation data set memory for the current extrapolation interval of the master device is detectable. In the event that such a deviation exists, the extrapolation execution unit of the master device performs an adjustment of the extrapolation data set. Such adjustment of the extrapolation data set is performed under the condition that the datum calculated for the end of the current extrapolation interval using the adjusted extrapolation data set is substantially equal to the value which would have been expected in the calculation of the extrapolation in the deviation-free case without adjustment of the extrapolation data. The slave devices are configured accordingly.

The present invention also provides a method using the above-described method and/or network of the present invention for providing and/or measuring data in an angularly synchronous manner. In an embodiment, the angles in question are items of positional information of a real and/or simulated engine; the use taking place especially in the context of rapid control prototyping, a hardware-in-the-loop simulation, or control unit calibration.

The present invention also provides a computer readable medium having stored thereon computer executable process steps operative to perform a method for synchronously providing data on distributed devices of a network, the distributed devices including at least one master device and at least one slave device associated with the master device, the master device and the slave device having a common synchronous system time, the network further including a data channel connecting the master device and the slave device. The method includes:

storing, by the master device, an extrapolation data set including at least one update time point, the at least one update time point being in the future and defining a beginning of an extrapolation interval;

transmitting, by the master device, the extrapolation data set to the slave device;

calculating, starting at the update time point, a new datum of the data separately on the master device and the slave device by extrapolation using the extrapolation data set; and repeating the storing, transmitting and calculating for subsequent extrapolation intervals.

The inventive method, the inventive network and the inventive use may be designed and refined in many specific ways.

BRIEF DESCRIPTION OF THE DRAWINGS

The present invention is elaborated below based on exemplary embodiments with reference to the drawings.

DETAILED DESCRIPTION

Figure 4:
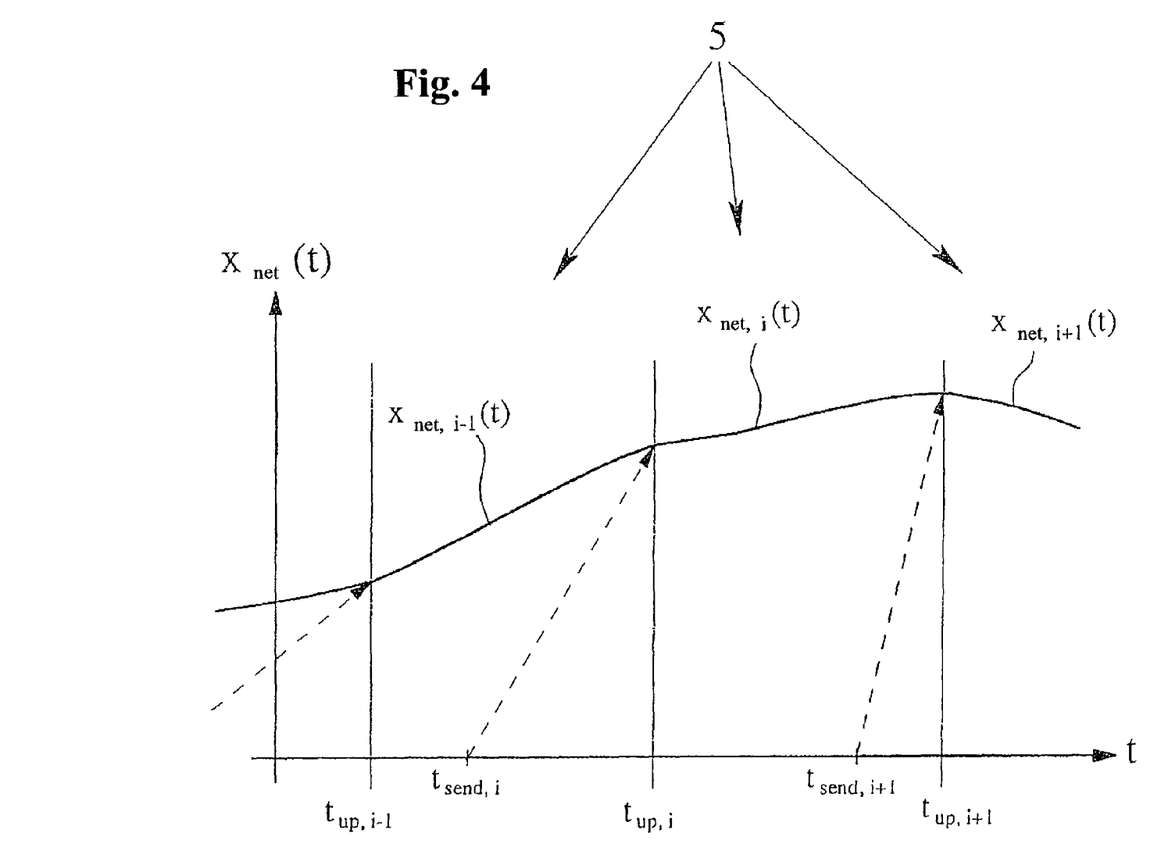
FIG. 4 depicts a last way of synchronously calculating and providing data according to an exemplary embodiment of the method and network according to the present invention.
Figure 5:
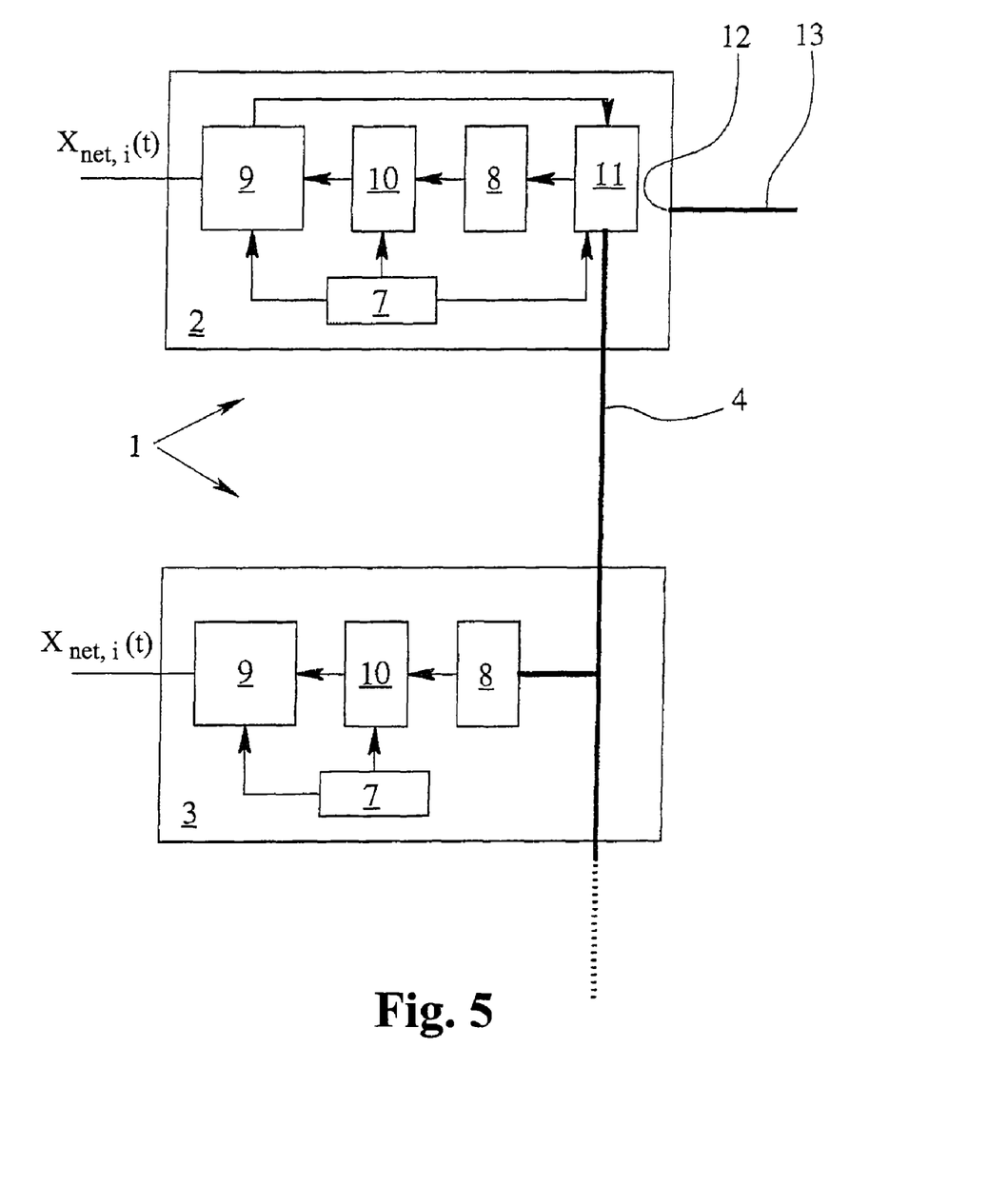
FIG. 5 shows a portion of a network according to the present invention, including a master device and a slave device.
Figure 6:
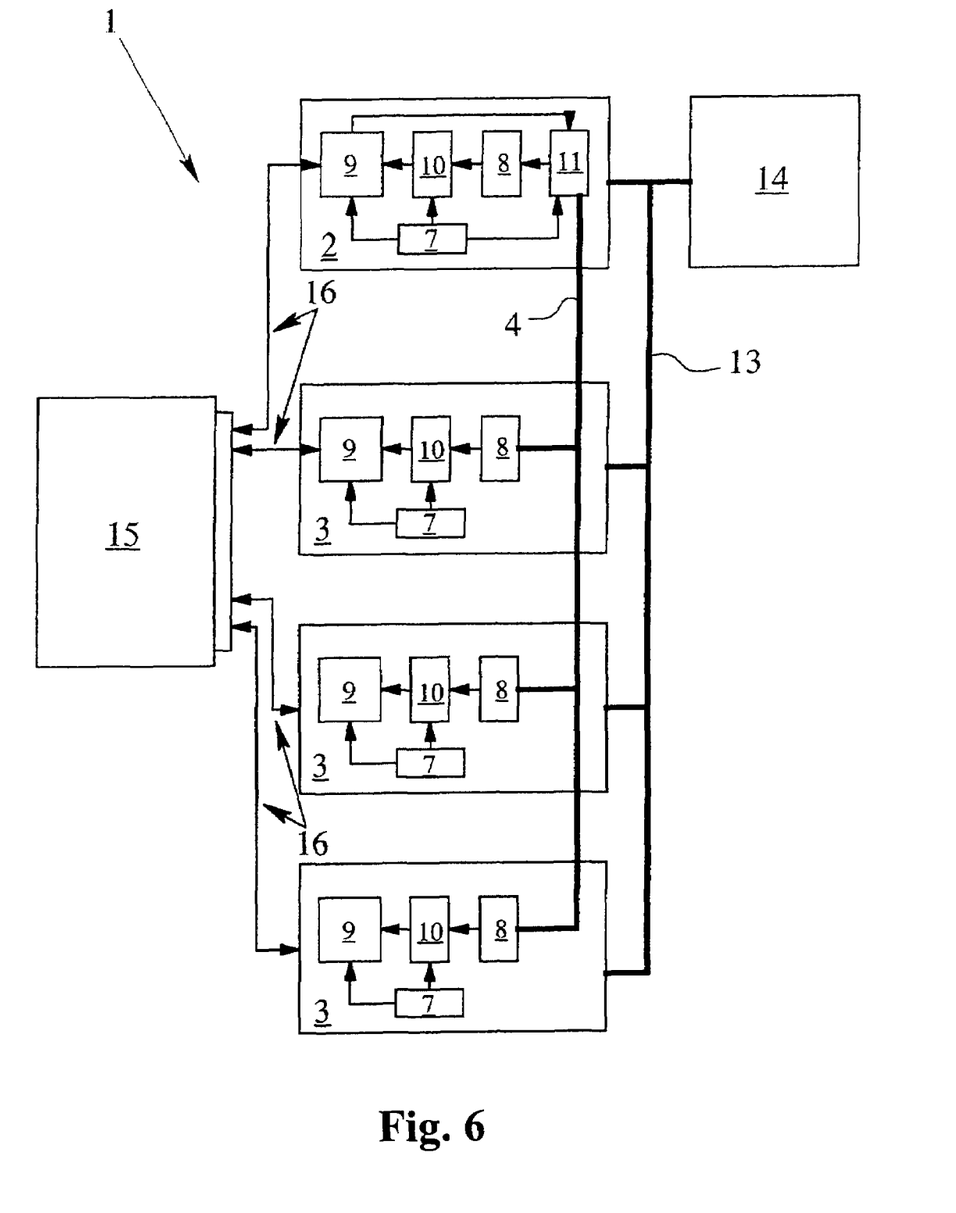
FIG. 6 illustrates an exemplary embodiment of an inventive network used in the context of a hardware-in-the-loop simulation.

In the following, the method and network of the present invention will be jointly explained with the aid of calculation results (FIGS. 1 through 4) which were obtained using exemplary embodiments of the method and network of the present invention. FIGS. 5 and 6 are mainly directed to the embodiment and the functional interaction of a master device and a slave device in a network according to the present invention.

FIG. 5 illustrates the basic configuration of a network 1 including a master device 2, a slave device 3 and a data channel 4 connecting master device 2 and slave device 3. It is indicated that further slave devices 3 may be connected to master device 2 via data channel 4.

Data channel 4 should generally be understood in a functional sense, regardless of the actual physical implementation. What is important is only that data can be transmitted over data channel 4. This can be accomplished, for example, using a wireless radio link or via optical waveguides. In the exemplary embodiment shown in FIGS. 5 and 6, however, data channel 4 is implemented as a serial data bus providing an electrical connection between master device 2 and the connected slave devices 3. In the exemplary embodiment shown, data channel 4 is implemented using standard technologies, here Ethernet standard interfaces. However, depending on the requirements placed on data channel 4, it is equally possible to use other interface standards, such as IEEE-1394 or USB. Of course, it may also be necessary to use proprietary solutions to implement data channel 4.

To carry out the method of the present invention for synchronously providing data, a common synchronous system time is available on devices 2, 3.

An extrapolation data set is transmitted from master device 2 over data channel 4 to slave device 3 and stored there. The extrapolation data includes an update time point $t_{up,i}$ which is in the future relative to the system time. Update time point $t_{up,i}$ defines the beginning of extrapolation interval 5 from which on the extrapolation data set is valid for calculations which are performed in the same way on both master device 2 and slave device 3.

The calculations in question are extrapolations based on the extrapolation data set stored on both master device 2 and slave device 3. The result of the extrapolations performed on master device 2 and slave device 3 in an autonomous but synchronous manner is new data $x_{net,i}(t)$, which may be synchronously provided by master device 2 and slave device 3. Current extrapolation interval 5 ends at the point at which the following update time point $t_{up,i+1}$ is reached.

In each of FIGS. 1 through 4, the curve of the data $x_{net}(t)$ calculated by extrapolation on master device 2 and/or slave device 3 is plotted over the synchronous system time t. The synchronous data $x_{net}(t)$ is calculated on a segment-by-segment basis in each extrapolation interval 5. In FIGS. 1 through 4, the results of the extrapolation are denoted as $x_{net,i-1}(t)$, $x_{net,i}(t)$ and $x_{net,i+1}(t)$, respectively. These extrapolation results are obtained in the extrapolation intervals 5 beginning at the corresponding instants $t_{up,i-1}$, $t_{up,i}$ und $t_{up,i+1}$. Also indicated in FIGS. 1 through 4 are the instants $t_{send,i-1}$, $t_{send,i}$ and $t_{send,i+1}$ at each of which an extrapolation data set is sent from master device 2 to slave devices 3, said extrapolation data sets each being used for extrapolation only at update time points $t_{up,i}$, and $t_{up,i+1}$ in the future.

Figure 1:
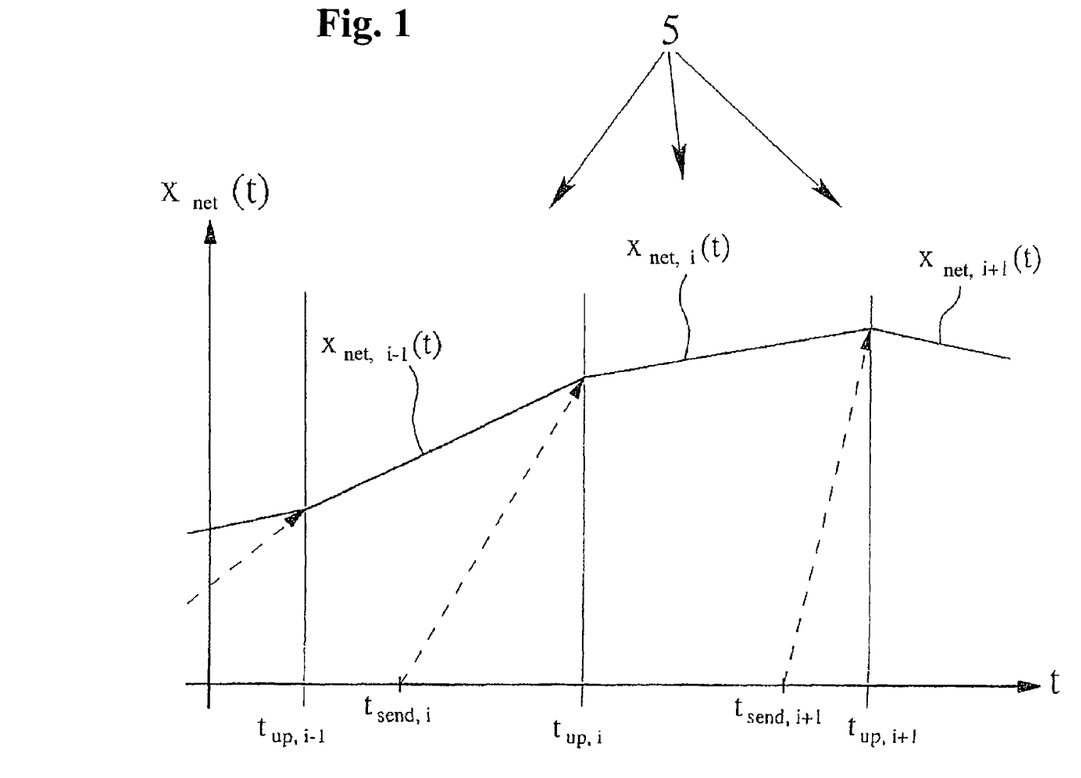
FIG. 1 shows the synchronous calculation and provision of data according to the exemplary embodiment of a method and network according to the present invention.

FIG. 1 shows the result of the synchronous provision of data $x_{net}$ based on an extrapolation performed on master device 2 and slave device 3 starting from the last value of the data $x_{net,i-1}(t_{up,i})$ that was calculated in the previous extrapolation interval 5. This results in the apparently continuous curve of data $x_{net}(t)$ in FIGS. 1, 3 and 4, which is "apparently continuous" because the curve of data $x_{net}(t)$ is actually composed of many values calculated at discrete points in system time, and actually constitutes a discrete-time sequence of values to which the concept of "continuity" does not apply in a mathematical sense. Rather, continuous is to be understood here as "linked to or starting with the last calculated value of the previous extrapolation interval 5". The method whose results are depicted in FIGS. 1 and 4 has the advantage of a smooth curve of the calculated data $x_{net}(t)$, without any jumps at the transition points between adjacent extrapolation intervals 5. However, it is disadvantageous that an error that has occurred in one extrapolation interval will propagate through all following extrapolation intervals 5.

Figure 2:
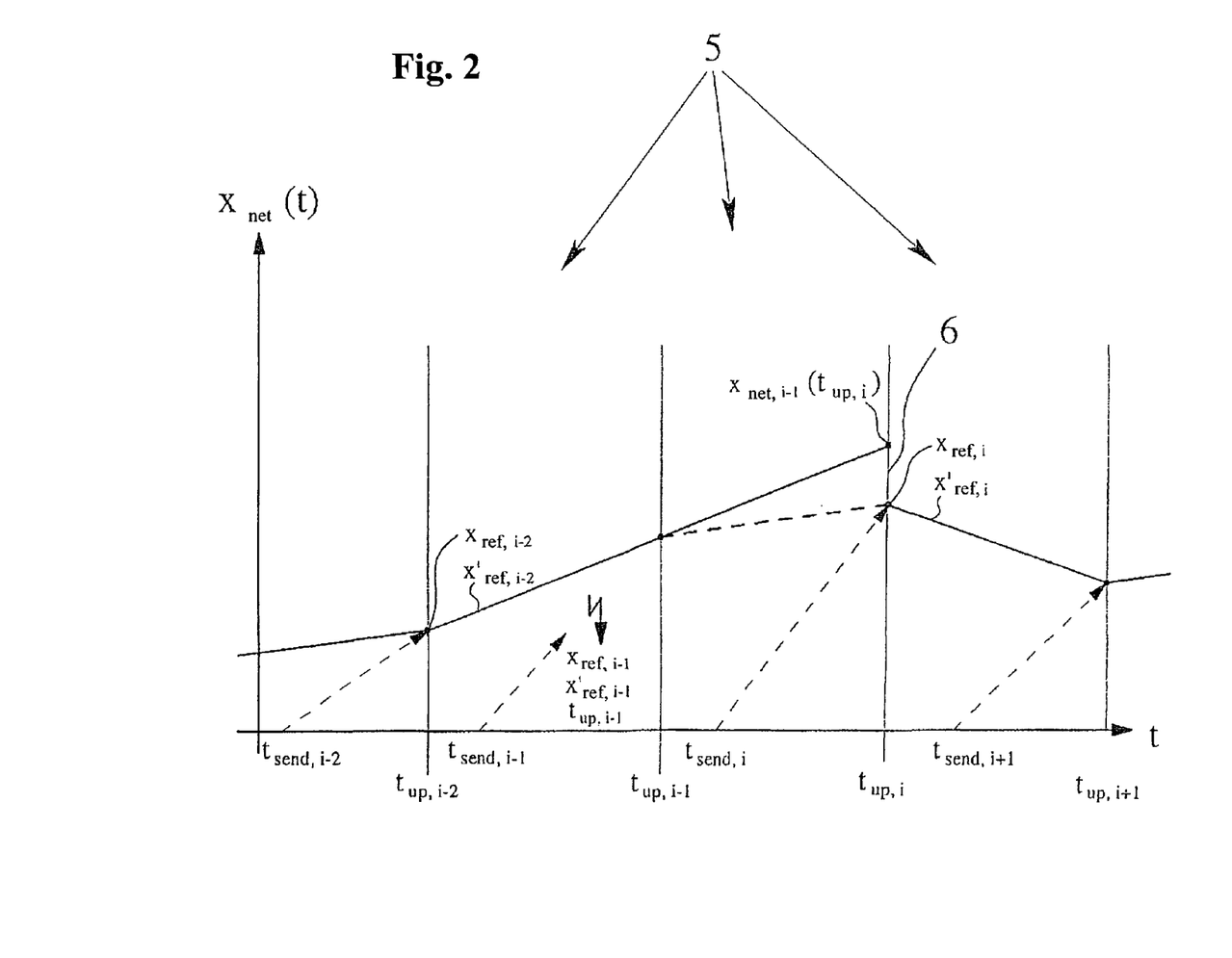
FIG. 2 illustrates the synchronous calculation and provision of data according to a further example of a method and network according to the present invention.

FIG. 2 shows the results of the extrapolation according to an exemplary embodiment of the inventive method in which a reference datum $x_{ref,i}$ of the data $x_{net,i}(t)$ at update time point $t_{up,i}$ is transmitted from master device 2 to slave device 3 along with the extrapolation data set and used on master device 2 and slave device 3 as a basis for the extrapolation in such a way that at update time point $t_{up,i}$, the extrapolation starts from the reference datum $x_{ref,i}$. In this embodiment of the method, it is then generally possible that at update time point $t_{up,i}$, the reference datum $x_{ref,i}$ deviates from the datum $x_{net,i-1}(t_{up,i})$ that was calculated in the previous extrapolation interval 5 for the update time point $t_{up,i}$, as shown in FIG. 2. The reason for such a deviation 6 is indicated in FIG. 2 as a failed transmission of the extrapolation data set that was intended to become active at update time point $t_{up,i-1}$. The error-free curve of data $x_{net,i-1}(t)$ is shown in FIG. 2 as a dashed line. Since this extrapolation data was not available at update time point $t_{up,i-1}$, the extrapolation was continued based on the extrapolation data set valid starting at update time point $t_{up,i-2}$.

Figure 3:
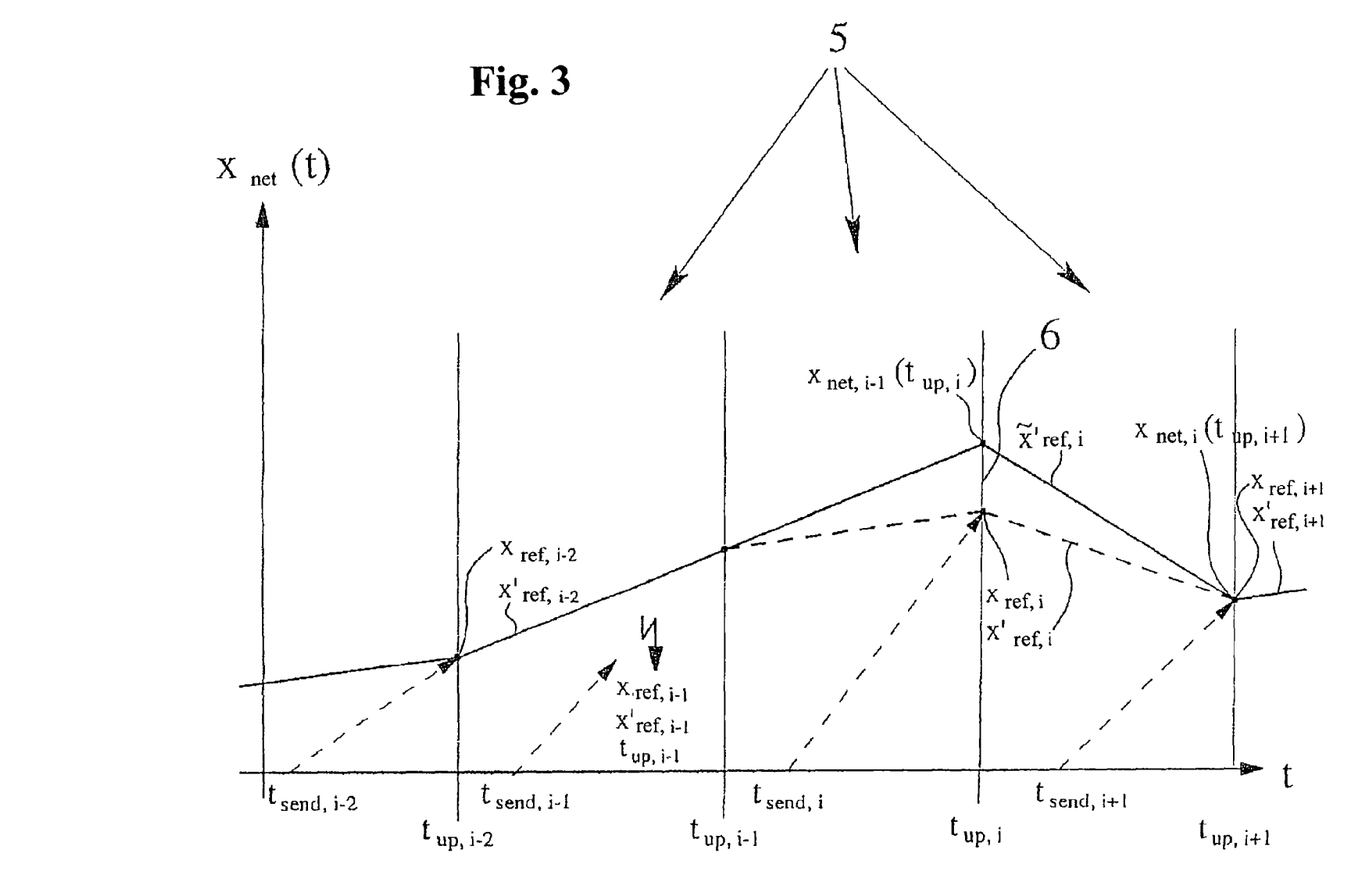
FIG. 3 illustrates another way of synchronously calculating and providing data according to an exemplary embodiment of a method and network according to the present invention.

FIG. 3 illustrates the extrapolation result that was obtained using a further exemplary embodiment of the method according to the present invention. This embodiment of the method combines the advantages of the "continuous" continuation of the calculated data $x_{net}(t)$ at extrapolation interval boundaries and the error correction using a predetermined reference datum $x_{ref,i}$ at an update time point $t_{up,i}$. The shown embodiment of the method has the feature that, if a deviation 6 is detected between the datum $x_{net,i-1}(t_{up,i})$ calculated on master device 2 and/or slave device 3 and the reference datum $x_{ref,i}$ predetermined on master device 2 and/or slave device 3, the respective device 2, 3 performs an adjustment of the extrapolation data set such that the datum $x_{net,i}(t_{up,i+1})$ calculated at the end of the current extrapolation interval 5 is substantially equal to the value which would have been expected in a regular calculation in the deviation-free case without adjustment of the extrapolation data The error indicated in FIG. 3 is the same as has already been explained with reference to FIG. 2. The dashed curve of the data $x_{net,i}(t)$ in the extrapolation interval 5 beginning at update time point $t_{up,i}$ resulted from the calculation of the data $x_{net,i}(t)$ based on the extrapolation data set available at update time point $t_{up, i}$ on master device 2 and/or slave device 3. This dashed curve can be calculated by master device 2 and slave device 3 without any problem, so that the value $x_{net, i}(t_{up,i+1})$ obtained in the error-free case can also be calculated exactly or to a very good approximation using a reasonable estimate of update time point $t_{up,i+1}$. In order to reach the target datum $x_{net, i}(t_{up, i+1})$ starting from the last calculated datum $x_{net, i-1}(t_{up, i})$, the extrapolation data set that is active on master device 2 and/or slave device 3 starting at update time point $t_{up, i}$ needs to be adjusted. The above-described exemplary embodiment of the method is particularly easy to implement if the extrapolation is linear, i.e., if the extrapolation can be described by the equation of a straight line.

The above-described exemplary embodiments of the inventive method can, of course, also be combined, for example, such that a reference datum $x_{ref, i}$ is not predetermined for each update time point $t_{up, i}$, but only at certain time intervals.

In FIGS. 1 through 3, the data $x_{net}(t)$ synchronously provided by master device 2 and slave device 3 was obtained by linear extrapolation.

In the exemplary embodiment of the method according to FIG. 1, the extrapolation data set includes a reference rate of data change $x'_{ref, i}$, which defines the gradient of the line segments shown. Since, at the beginning of a new extrapolation interval 5, the extrapolation always starts from the last calculated datum $x_{net, i-1}(t_{up, i})$, the resulting curve of the calculated data $x_{net}(t)$ shown is of the type of a polyline.

FIG. 2 illustrates a method variant which uses linear extrapolation and in which, in addition to update time point $t_{up, i}$ and reference rate of data change $x'_{ref, i}$, the reference datum $x_{ref, i}(t_{up, i})$ is also included in the extrapolation data set; the linear extrapolation starting from the predetermined reference datum $x_{ref, i}$ at update time point $t_{up, i}$.

In the case of the linear extrapolation, the above generally described adjustment of the extrapolation data set for obtaining the curve of the data $x_{net, i}(t)$ according to FIG. 3 consists in simply calculating the equation of the straight line passing through the two points $x_{net, i-1}$ at update time point $(t_{up, i})$ and $x_{net, i}$ at update time point $t_{up, i+1}$. Thus, the adjustment of the extrapolation data set consists in calculating a new reference rate of data change $\tilde{x}'_{ref, i}$, which is calculated by master device 2 and/or slave device 3, stored and used starting at the beginning of extrapolation interval 5.

The extrapolation data set on master device 2, before it is sent to slave device 3, can have very different origins. For example, the extrapolation data set for the next extrapolation interval can be calculated entirely on the master device, but can also, at least partially, be communicated to master device 2 from external sources.

In the methods underlying FIGS. 1 through 3, the reference rate of data change $x'_{ref, i}$ is communicated to master device 2 from external sources, which always takes place before transmission instants $t_{send, i}$. After that, master device 2 calculates the next update time point $t_{up, i}$. This is especially easy if update time points $t_{up, i}$ are equidistant from each other, as shown in FIGS. 1 through 3. However, when calculating the next update time point $t_{up, i}$, factors such as the maximum/estimated time for calculating the extrapolation data set and the maximum/estimated latency until transmission of the extrapolation data set, as well as the maximum/estimated transmission time of the extrapolation data set, including any required error correction, may also enter into the calculation. Once master device 2 has determined the next update time point $t_{up, i}$, it can calculate the next reference datum $x_{ref, i}$ for the data $x_{net, i}$ at the next update time point $t_{up, i}$ by simply calculating the equation of a straight line, thereby completing the extrapolation data set.

FIG. 4 illustrates the result obtained in an exemplary embodiment of the method for the calculation and synchronous provision of the data $x_{net}$ which is not based on linear extrapolation. The extrapolation according to FIG. 4 is based on the use of higher-order polynomials as extrapolation functions. Here, the polynomials are calculated on a segment-by-segment basis in such a manner that, at the transitions to adjacent extrapolation intervals, they are continuous with respect to the function itself, and, in addition, also with respect to its first and second time derivatives. Such polynomials are usually referred to as splines.

FIG. 5 shows a network 1 which is generally capable of carrying out all above-described exemplary embodiments of the method according to the present invention.

In order to provide a common synchronous system time t on master device 2 and slave device 3, both devices are provided with a system clock 7, the two of which are synchronized with each other. Master device 2 and slave device 3 each include an extrapolation data set memory 8 for storing an extrapolation data set containing at least one update time point $t_{up, i}$, an extrapolation execution unit 9 for synchronously calculating and providing data $x_{net, i}(t)$ based on the extrapolation data set, and an updating unit 10 which signals to extrapolation execution unit 9 when a new extrapolation interval begins and, therefore, the current extrapolation data set available in extrapolation data set memory 8 is to be used as the basis for the further extrapolation. In addition to these components, master device 2 further includes an extrapolation planning unit 11 for, at least partially, calculating the extrapolation data set and/or for providing the extrapolation data set in extrapolation data set memory 8 of master device 2 and of slave device 3; it being possible for the extrapolation data set to be transmitted from master device 2 to slave device 3 over data channel 4. In the exemplary embodiment according to FIG. 5, system clocks 7 are synchronized also over data channel 4.

In the exemplary embodiment according to FIGS. 5 and 6, master device 2 also has a further external interface 12 over which it can receive data from a further electronic device 14 via a further data channel 13. In the present case, this data is extrapolation data for the extrapolation data set.

Extrapolation execution unit 9 of master device 2 and/or that of slave device 3 are each configured such that the extrapolations performed in the context of the above-described exemplary embodiments of the inventive method can be performed on master device 2 and/or slave device 3 (methods according to FIGS. 1 and 4). Thus, in one exemplary embodiment, extrapolation execution unit 9 is configured such that the extrapolation it can perform starts from the last datum $x_{net, i-1}(t_{up, i})$ calculated by it in the previous extrapolation interval 5. In a further exemplary embodiment, the extrapolation data set storable in extrapolation data set memory 8 of master device 2 and/or of slave device 3 includes a reference datum $x_{ref, i}$ of the data $x_{net, i}(t)$ at update time point $t_{up, i}$, the extrapolation performable by extrapolation execution unit 9 of master device 2 and/or of slave device 3 at update time point $t_{up, i}$ starting from the reference datum $x_{ref, i}$ (method according to FIG. 2).

In order to carry out the method according to FIG. 3, extrapolation execution unit 9 of master device 2 and/or of slave device 3 is configured such that a deviation 6 between the calculated datum $x_{net, i-1}(t_{up, i})$ and the reference datum $x_{ref, i}$ stored in extrapolation data set memory 8 of master device 2 and/or of slave device 3 is detected, and, in the event that a deviation 6 is detected, the extrapolation data set can be adjusted such that the datum $x_{net, i}(t_{up,i+1})$ calculated at the end of the current extrapolation interval 5 is substantially equal to the value which would have been expected in a regular calculation in the in the deviation-free case without adjustment of the extrapolation data.

In the exemplary embodiment shown in FIG. 5, extrapolation execution unit 9 of master device 2 and/or of slave device 3 is permanently configured for a specific type of function to be used for performing the extrapolation. Therefore, the information contained in the extrapolation data set is only used to parameterize the extrapolation function. In another exemplary embodiment, extrapolation execution unit 9 is freely programmable with respect to the extrapolation function to be used in each new extrapolation interval 5, so that the extrapolation function is freely definable using suitable information in the extrapolation data set.

In a further exemplary embodiment, the network according to FIG. 5 and the extrapolation execution unit 9 of master device 2 and/or of slave device 3 are configured such that polynomials can be used as an extrapolation function type. In this exemplary embodiment, the polynomials are calculated by extrapolation planning unit 11 of master device 2 and stored in extrapolation data set memory 8 in such a manner that, at the transitions to adjacent extrapolation intervals 5, the calculated data $x_{net}(t)$ is continuous, namely with respect to the function itself, and, in addition, also with respect to its first and second time derivatives (extrapolation according to FIG. 4).

In further exemplary embodiments of network 1 according to FIGS. 5 and 6, a linear extrapolation is implemented in extrapolation execution units 9 of master device 2 and slave device 3. In a first exemplary embodiment of this category, the extrapolation data set stored in the extrapolation data set memory of master device 2 and of slave device 3 includes also a reference datum $x_{ref, i}$ for the data $x_{net, i}(t)$ at update time point $t_{up, i}$; the linear extrapolation of the data $x_{net, i}(t)$ at update time point $t_{up, i}$ being performed by extrapolation execution units 9 starting from the predetermined reference datum $x_{ref, i}$. Using a network 1 configured in this manner, the curves obtained for the calculated and synchronously provided data $x_{net}(t)$ are as shown in FIG. 2.

In another embodiment of the network based on a linear extrapolation according to FIGS. 5 and 6, the reference rate of data change $x'_{ref, i}$ is communicated to master device 2 from external sources, so that the next update time point $t_{up, i}$ can be calculated by extrapolation planning unit 11 of master device 2; the next reference datum $x_{ref, i}$ for the data $x_{net, i}(t)$ at the next update time point $t_{up, i}$ being calculated by extrapolation planning unit 11 of master device 2 from the aforementioned information by calculating the equation of a straight line.

In the network shown in FIG. 6, master device 2 receives the extrapolation data set, at least partially, from further external device 14 via further data channel 13, said further external device taking the form of a simulation computer. Further data channel 13 is also connected to slave devices 3. This connection is used to transmit data, especially I/O data that does not need to be processed by extrapolation planning unit 11 or extrapolation execution unit 9. Master device 2 and slave devices 3 are each further equipped with an I/O data channel 16 allowing devices 2, 3 of network 1 to be connected to any desired technical/physical process, here in the form of a control unit 15. Each I/O data channel 16 (shown here only as a single line) can include a plurality of separate channels, for example, several channels of a digital-to-analog converter, of an analog-to-digital converter, digital inputs and outputs, outputs of power driver stages, and other interfaces. In any case, the individual I/O data channels 16 also include a signal line via which the data $x_{net}(t)$ calculated and synchronously provided by master device 2 and slave devices 3 is made available to the outside.

In the present case, simulation computer 14 calculates the mathematical model of an internal combustion engine. The model is calculated on simulation computer 14 using numerical methods which calculate the state variables of the model in a fixed time pattern at equidistant nodes. One of the state variables is, for example, the angular speed of the engine crankshaft. In addition to other values, this angular speed is also transmitted as part of the extrapolation data set over further data channel 13 to master device 2 in the fixed simulation time pattern.

Extrapolation planning unit 11 of master device 2 calculates the next update time point $t_{up, i}$, taking into account calculation and transmission times, and the reference datum $x_{ref, i}$ for the crankshaft angle reached at instant $t_{up, i}$, taking into account the currently valid reference rate of data change $x'_{ref, i-1}$, which corresponds to the angular speed of the engine crankshaft in the extrapolation interval 5 that began at update time point $t_{up, i-1}$; angles of more than 360 degrees and negative angles being permissible in this connection.

The data calculated in this manner forms the extrapolation data set which is subsequently transmitted by master device 2 over common data channel 4 to slave devices 3, where it is activated at update time point $t_{up, i}$.

In the exemplary embodiment according to FIG. 6, the engine model is calculated on simulation computer 14 in real time with a node spacing of one millisecond. Accordingly, the calculated angular speed of the engine crankshaft is also transmitted at intervals of one millisecond over further data channel 13 to master device 2, i.e., to extrapolation planning unit 11 of master device 2. Following the same time pattern, extrapolation planning unit 11 of master device 2 completes the extrapolation data set and transmits it to extrapolation data set memory 8 of master device 2 and of slave devices 3.

In the exemplary embodiment shown, the calculation of the data $x_{net}(t)$ is performed on master device 2 and slave devices 3 at a thousand times higher rate, i.e., at a frequency of one MHz, so that in one extrapolation interval 5, a thousand angle values $x_{net}(t)$ of the engine crankshaft are calculated and synchronously provided by master device 2 and slave devices 3. In the present case, this is necessary to obtain a sufficiently high angular resolution for the stimulation of control unit 15.

In a further exemplary embodiment, data channel 4 and further data channel 13 coincide physically and functionally to form a single data channel. In this case, all data, including data that does not need to be processed by extrapolation planning unit 11 or extrapolation execution unit 9, is transmitted by the one data channel; an identifier of the data allowing master device 2 and slave device 3 to distinguish the data intended to be processed by extrapolation planning unit 11 and extrapolation execution unit 9 from the data that is, as it were, bypassed around these units.

In the exemplary embodiments of network 1 shown in FIGS. 5 and 6, the functionality of the master device and/or of the slave device is, at least partially, implemented using field-programmable arrays (FPGAs). However, it is equally possible to implement the functionality of master device 2 and/or of slave device 3 using, for example, a microprocessor circuit.

What is claimed is:

1. A method for synchronously providing data on distributed devices of a network, the distributed devices including a master device and a slave device associated with the master device, the master device and the slave device having a common synchronous system time, the network further including a data channel connecting the master device and the slave device, the method comprising:
  storing, by the master device, an extrapolation data set including at least one update time point, the at least one update time point being in the future and defining a beginning of an extrapolation interval;
  transmitting, by the master device, the extrapolation data set to the slave device;
  calculating, starting at the update time point, a new datum of the data separately on the master device and the slave device by extrapolation using the extrapolation data set; and
  repeating the storing, transmitting and calculating for subsequent extrapolation intervals.

2. The method as recited in claim 1 wherein the distributed devices are devices of a distributed real-time system.

3. The method as recited in claim 1 wherein the extrapolation on at least one of the master device and the slave device starts from a last datum of the data calculated on the respective device in a previous extrapolation interval.

4. The method as recited in claim 1 wherein the extrapolation data set includes a reference datum of the data at the update time point.

5. The method as recited in claim 4 wherein the extrapolation on at least one of the master device and the slave device at the update time point starts from the reference datum.

6. The method as recited in claim 4 further comprising, when a deviation exists between the reference datum and the new datum of the data calculated on at least one of the master device and the slave device, adjusting, by the respective device, the extrapolation data set so that a subsequent datum of the data calculated at an end of a current extrapolation interval is substantially equal to a value which would have been expected in a regular calculation in a deviation-free case without an adjustment of the extrapolation data.

7. The method as recited in claim 1 wherein the extrapolation data set defines an extrapolation function, and further comprising defining the extrapolation function by specifying parameters of a function type previously defined on at least one of the master device and the slave device.

8. The method as recited in claim 7 wherein the function type includes a polynomial.

9. The method as recited in claim 8 wherein the polynomial is continuous at a transition to an adjacent extrapolation interval.

10. The method as recited in claim 8 wherein at least one time derivative of the polynomial is continuous at a transition to an adjacent extrapolation interval.

11. The method as recited in claim 1 wherein:
  the extrapolation data set includes a reference rate of data change of the data; and
  the extrapolation includes a linear extrapolation.

12. The method as recited in claim 11 wherein:
  the reference rate of data change includes an angular speed; and
  the data include an angle.

13. The method as recited in claim 11 wherein:
  extrapolation data set includes a reference datum for the data at the update time point; and
  the extrapolation includes a linear extrapolation, the extrapolation starting from the reference datum.

14. The method as recited in claim 6 wherein:
  the extrapolation data set includes a reference rate of data change of the data; and
  the adjusting includes a calculation of a new reference rate of data change based on at least one of a length of the extrapolation interval and an assumption about the length of the extrapolation interval.

15. The method as recited in claim 11 further comprising, when a deviation exists between the reference datum and a last datum of the data calculated on at least one of the master device the slave device, adjusting, by the respective device, the extrapolation data set so that the new datum of the data is substantially equal to a value which would have been expected in a regular calculation in a deviation-free case without an adjustment of the extrapolation data, and wherein the adjusting includes a calculation of a new reference rate of data change based on at least one of a length of the extrapolation interval and an assumption about the length of the extrapolation interval.

16. The method as recited in claim 1 further comprising at least partially calculating, by the master device, the extrapolation data set, or communicating the extrapolation data set to the master device from at least one external source.

17. The method as recited in claim 11 wherein the extrapolation data set includes a reference datum for the data at the update time point, and further comprising:
  communicating the reference rate of data change to the master device from at least one first external source;
  determining, by the master device or at least one second external source, a next update time point; and
  calculating, by the master device, a next reference datum for the data at the next update time point based on the reference rate of data change by calculating an equation of a straight line.

18. The method as recited in claim 16 wherein:
  the extrapolation data set includes a reference datum for the data at the update time point; and
  the extrapolation data set includes a reference rate of data change of the data; and further comprising:
  communicating the reference rate of data change to the master device from at least one first external source;
  determining, by the master device or at least one second external source, a next update time point; and
  calculating, by the master device, a next reference datum for the data at the next update time point based on the reference rate of data change by calculating an equation of a straight line.

19. The method as recited in claim 1 wherein the calculating is performed so as to at least one of provide and measure the data in an angularly synchronous manner.

20. The method as recited in claim 19 wherein the data include positional information of at least one rotating part of at least one of a real and a simulated engine.

21. The method as recited in claim 20 wherein the calculating is performed so as to provide at least one of a rapid control prototyping, a hardware-in-the-loop simulation, and a control unit calibration.

22. A network for synchronously providing data, comprising:
  a master device;
  a slave device; and
  at least one data channel connecting the master device and the slave device; wherein:
  the master device and the slave device each include a respective:
    synchronized system clock configured to provide a common synchronous system time;
    extrapolation data set memory configured to store an extrapolation data set including at least one update time point in the future and defining a beginning of an extrapolation interval;

extrapolation execution unit configured to synchronously calculate and provide data based on the stored extrapolation data set in the respective extrapolation data set memory; and updating unit configured to trigger the respective extrapolation execution unit to use the extrapolation data set stored in the respective extrapolation data set memory, starting at the update time point at a start of a current extrapolation interval;

the master device includes an extrapolation planning unit configured to at least one of calculate, at least partially, the extrapolation data set and provide the extrapolation data set in the extrapolation data set memory of the master device; and the master device is configured to transmit the extrapolation data set from the master device to the slave device over the data channel.

23. The network as recited in claim 22 wherein the master device is configured to receive the extrapolation data set, at least partially, from at least one of an electronic device via the data channel and a further data channel via an external interface.

24. The network as recited in claim 22 wherein the respective extrapolation execution unit of at least one of the master and the slave device is configured to perform an extrapolation starting from a last datum of the data calculated in the respective extrapolation execution unit in a previous extrapolation interval.

25. The network as recited in claim 22 wherein the extrapolation data set includes a reference datum of the data at the at least one update time point.

26. The network as recited in claim 25 wherein the respective extrapolation execution unit of at least one of the master and the slave device is configured to perform an extrapolation at the at least one update time point starting from the reference datum.

27. The network as recited in claim 25 wherein the respective extrapolation execution unit of at least one of the master and the slave device is configured, when a deviation exists between a respective datum of the data calculated by the respective extrapolation execution unit and the reference datum, to perform an adjustment of the extrapolation data set so that a datum of the data calculated at an end of the current extrapolation interval is substantially equal to a value which would have been expected in a calculation in a deviation-free case without an adjustment of the extrapolation data.

28. The network as recited in claim 22 wherein the extrapolation data set includes an extrapolation function, the extrapolation function being defined by at least one parameter of a function type previously defined on the respective extrapolation execution unit of at least one of the master and the slave device.

29. The network as recited in claim 22 wherein the extrapolation data set includes an extrapolation function, the extrapolation function being defined by at least one parameter of a function type included in the extrapolation data set.

30. The network as recited in claim 28 wherein the function type includes a polynomial.

31. The network as recited in claim 29 wherein the function type includes a polynomial.

32. The network as recited in claim 30 wherein the polynomial is continuous at a transition to an adjacent extrapolation interval.

33. The network as recited in claim 31 wherein the polynomial is continuous at a transition to an adjacent extrapolation interval.

34. The network as recited in claim 30 wherein at least one time derivative of the polynomial is continuous at a transition to an adjacent extrapolation interval.

35. The network as recited in claim 31 wherein at least one time derivative of the polynomial is continuous at a transition to an adjacent extrapolation interval.

36. The network as recited in claim 22 wherein:
the extrapolation data set includes a reference rate of data change of the data; and
the respective extrapolation execution unit of at least one of the master and the slave device is configured to calculate a new datum of the data by linear extrapolation starting at the at least one update time point.

37. The network as recited in claim 36 wherein:
the extrapolation data set includes a reference datum for the data at the update time point; and
the respective extrapolation execution unit of at least one of the master and the slave device is configured to calculate the new datum of the data by linear extrapolation starting from the reference datum.

38. The network as recited in claim 37 wherein:
the master device is configured to receive the reference rate of data change from at least one first external source;
the master device is configured to at least one of calculate, by the respective extrapolation planning unit, and receive, from at least one second external source, a next update time point; and
the extrapolation planning unit of the master device is configured to calculate a next reference datum for the data at the next update time point based on the reference rate of data change by calculating an equation of a straight line.

39. The network as recited in claim 22 wherein:
the extrapolation data set includes a reference datum for the data at the at least one update time point;
the master device is configured to receive the extrapolation data set, at least partially, via an external interface from an external electronic device; and
the extrapolation planning unit of the master device is configured to calculate a next reference datum at a next update time point based on the extrapolation data by calculating an equation of a straight line.

40. The network as recited in claim 39 further comprising a simulation computer configured to send the extrapolation data set to the master device at a predetermined time interval.

41. The network as recited in claim 22 wherein a respective ratio of a refresh rate of the extrapolation data set to a calculation rate of the data by the respective extrapolation execution unit of the master or the slave device is 0.5 or less.

42. The network as recited in claim 22 wherein at least a portion of at least one of the master device and the slave device include at least one of a field-programmable array and a microprocessor circuit.

43. The network as recited in claim 22 wherein the master device and the slave device each include a respective universal master/slave unit configurable, by at least one of hardware and software, to perform as the master or slave device.

44. The network as recited in claim 22 wherein the respective extrapolation execution unit of at least one of the master device and the slave device is configured to synchronously calculate so as to at least one of provide and measure the data in an angularly synchronous manner.

45. The network as recited in claim 44 wherein the data include positional information of at least one rotating part of at least one of a real and a simulated engine.

46. The network as recited in claim 45 wherein the respective extrapolation execution unit of at least one of the master device and the slave device is configured to synchronously calculate so as to support at least one of a rapid control prototyping, a hardware-in-the-loop simulation, and a control unit calibration.

47. A computer readable medium having stored thereon computer executable process steps operative to perform a method for synchronously providing data on distributed devices of a network, the distributed devices including a master device and a slave device associated with the master device, the master device and the slave device having a common synchronous system time, the network further including a data channel connecting the master device and the slave device, the method comprising:

storing, by the master device, an extrapolation data set including at least one update time point, the at least one update time point being in the future and defining a beginning of an extrapolation interval;

transmitting, by the master device, the extrapolation data set to the slave device;

calculating, starting at the update time point, a new datum of the data separately on the master device and the slave device by extrapolation using the extrapolation data set; and repeating the storing, transmitting and calculating for subsequent extrapolation intervals.

* * * * *